(12) United States Patent
Goami

(10) Patent No.: US 7,437,746 B2
(45) Date of Patent: Oct. 14, 2008

(54) LENS DRIVING APPARATUS

(75) Inventor: Kazutaka Goami, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 639 days.

(21) Appl. No.: 11/181,702

(22) Filed: Jul. 13, 2005

(65) Prior Publication Data

US 2006/0012703 A1 Jan. 19, 2006

(30) Foreign Application Priority Data

Jul. 13, 2004 (JP) .......................... P2004-205393

(51) Int. Cl.
*G11B 7/08* (2006.01)

(52) U.S. Cl. ...................................... 720/681
(58) Field of Classification Search ............... None
See application file for complete search history.

(56) References Cited

U.S. PATENT DOCUMENTS 5,446,721 A * 8/1995 Sekimoto et al. ............ 720/684
5,673,247 A * 9/1997 Sekimoto et al. ........ 369/112.17
7,308,752 B2 * 12/2007 Tanaka ....................... 29/603.1

FOREIGN PATENT DOCUMENTS

JP         10-269600       10/1998

* cited by examiner

*Primary Examiner*—David D Davis
(74) *Attorney, Agent, or Firm*—Ladas & Parry LLP

(57) ABSTRACT

A lens driving apparatus including a fixing member; a moving member which is movably provided with respect to the fixing member; an objective lens which is held by the movable member; a connecting member which elastically connects the fixing member to the movable member, wherein the connecting member includes first to fourth wire members which are arranged in a shape to be widened narrowed toward ends of the first to fourth wire members.

10 Claims, 4 Drawing Sheets

FIG. 4

|  | COMPARATIVE EXAMPLE | EXAMPLE | DIFFERENCE |
|---|---|---|---|
| D1, D3 [mm] | 14.4 | 14.4 | ±0 |
| D2, D4 [mm] | 12.2 | 12.2 | ±0 |
| D5, D7 [mm] | 3.0 | 2.8 | −0.2 (−6.7%) |
| D6, D8 [mm] | 3.0 | 3.0 | ±0 |
| RESONANCE FREQUENCY IN DIRECTION F [Hz] | 27 | 25 | −2 |
| RESONANCE FREQUENCY IN DIRECTION T [Hz] | 47 | 47 | ±0 |
| RESONANCE FREQUENCY IN DIRECTION R [Hz] | 135 | 190 | +55 |

LENS DRIVING APPARATUS

BACKGROUND OF THE INVENTION

1. Field of the Invention

The present invention relates to a technical field of the lens driving apparatus for driving an objective lens.

2. Related Art

In a conventional technique, a lens driving apparatus which includes a suspension base, a bobbin which is movably provided with respect to the suspension base, an objective lens retained by the bobbin, and a suspension wire which elastically connects the suspension base to the bobbin is disclosed in Japanese Unexamined Patent Publication No. JP-A-10-269600.

However, the above conventional lens driving apparatus has a problem of a so-called rolling phenomenon in which a lens holder (bobbin) rotates in a jitter direction (hereinafter referred to as a rolling direction) by mismatch of the center of gravity and a line of action of driving force when the lens holder is driven in the tracking direction.

Ordinarily, because the resonance frequency of the conventional lens driving apparatus in the rolling direction exists in a range of several dozen of Hz to one hundred and several dozen of Hz, there may be a case where the resonance frequency in the rolling direction matches the rotary frequency (utmost about 170 Hz) of an optical disk. In this case.

In this case, when the optical disk is driven to rotate, there is a problem that a phenomenon of rolling is induced and a coma aberration is produced by losing a symmetry of a light beam which passes through the objective lens, and a signal level for recording and reproducing is turned down.

SUMMARY OF THE INVENTION

It is therefore an object of the present invention to provide a lens driving apparatus which can set a resonance frequency in a rolling direction outside a range of a rotational frequency of an optical disk to suppress a phenomenon of rolling.

According to a first aspect of the invention, there is provided a lens driving apparatus including:

a fixing member;

a moving member which is movably provided with respect to the fixing member;

an objective lens which is held by the movable member;

a connecting member which elastically connects the fixing member to the movable member, wherein the connecting member includes a first wire member and a second wire member which are arranged along a planar surface extending along a direction of the radius of the objective lens and a third wire member and a fourth wire member which are arranged along another planar surface extending along a direction of the radius of the objective lens, the first to fourth suspension wire members respectively have first ends which are connected to the fixing member and second ends which are connected to the movable member, and one of distances D1 and D2 is smaller than the other, one of distances D3 and D4 is smaller than the other, one of distances D5 and D6 is smaller than the other and one of distances D7 and D8 is smaller than the other where the distance D1 designates a distance between the first end of the first suspension wire member and the first end of the second suspension wire member, the distance D2 designates a distance between the second end of the first suspension wire member and the second end of the second suspension wire member, the distance D3 designates a distance between the first end of the third suspension wire member and the first end of the fourth suspension wire member, the distance D4 designates a distance between the second end of the third suspension wire member and the second end of the fourth suspension wire member, the distance D5 designates the distance between the first end of the first suspension wire member and the first end of the third suspension wire member, the distance D6 designates a distance between the second end of the first suspension wire member and the second end of the third suspension wire member, the distance D7 designates a distance between the first end of the second suspension wire member and the first end of the fourth suspension wire member, and the distance D8 designates a distance between the second end of the second suspension wire member and the second end of the fourth suspension wire member.

According to a second aspect of the invention, there is provided the lens driving apparatus according to the first aspect, wherein D1=D3, D2=D4, D5=D7 and D6=D8 are satisfied.

According to a third aspect of the invention, there is provided the lens driving apparatus according to the first aspect, wherein D1>D2, D3>D4, D5<D6 and D7<D8 are satisfied.

According to a third aspect of the invention, there is provided the lens driving apparatus according to the first aspect, wherein D1<D2, D3<D4, D5>D6 and D7>D8 are satisfied.

According to a fourth aspect of the invention, there is provided the lens driving apparatus according to the first aspect, wherein differences of the distances are within ±10% of the distances to be compared.

BRIEF DESCRIPTION OF THE DRAWINGS

In the accompanying drawings:

FIG. 4 is a table of an actual measurement value of resonance frequency of the lens driving apparatus illustrated in FIG. 2.

DESCRIPTION OF THE PREFERRED EMBODIMENTS

Figure 1:
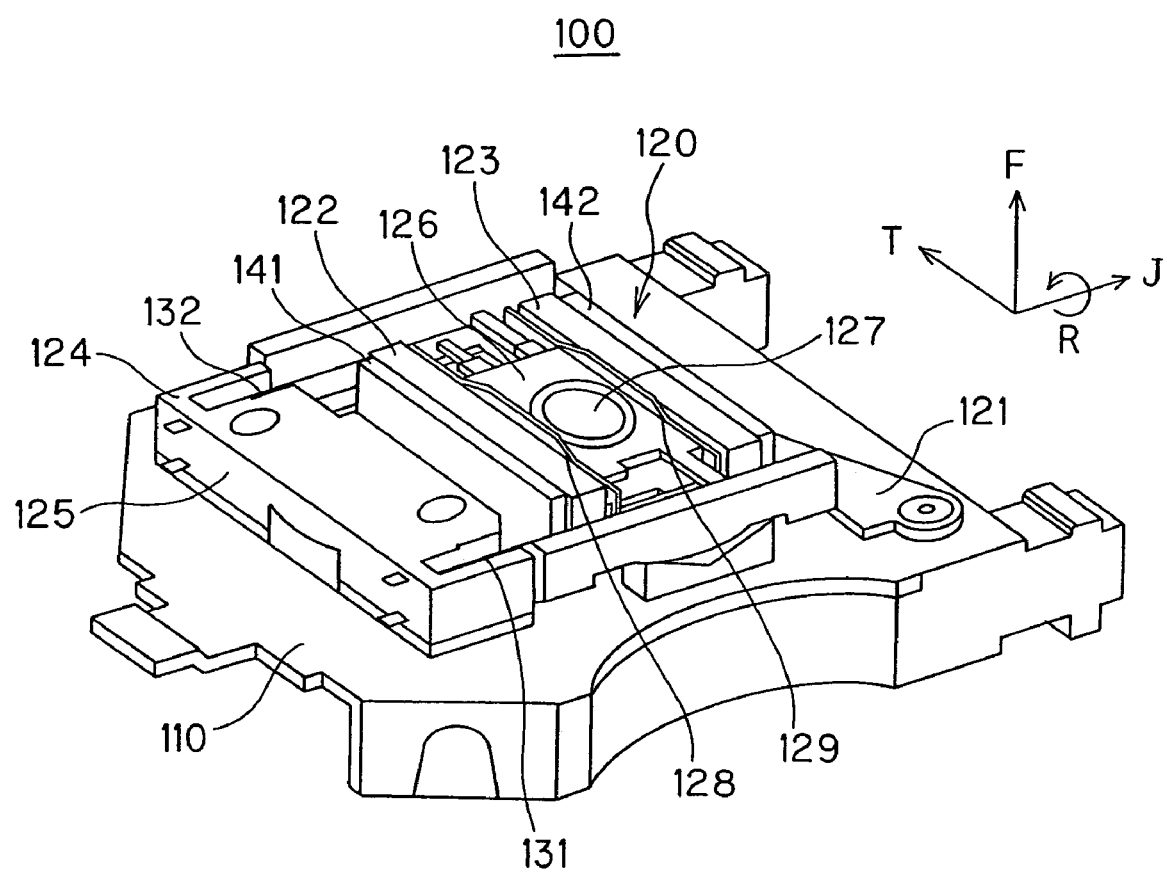
FIG. 1 is a perspective view of an optical pick-up apparatus according to an embodiment of the present invention.

Preferred embodiments of the present invention will be described in conjunction with figures. In the embodiment to be described below, the lens driving apparatus according to the present invention is applied to, for example, an optical pick-up apparatus.

Hereinafter, each meaning of the reference numbers in the drawings is as follows:

100: optical pick-up apparatus; 110: actuator body; 120: lens driving apparatus; 121: actuator base; 122, 123: magnet; 124: suspension holder; 125: actuator substrate; 126: lens holder, 127: objective lens; 128, 129: print coil; 131, 132, 133, 134: suspension wire; 131a, 132a, 133a, 134a: one end; 131b, 132b, 133b, 134b: other end; 141, 142: yoke.

Specifically, the optical pick-up apparatus according to the embodiment is formed to record or reproduce information by irradiating a light beam to an information recording medium such as a compact disk (CD), a digital versatile disk (DVD) and a large capacity disk (hereinafter referred to as an optical disk).

In this embodiment, the direction of focus is referred to as a direction F, the direction of tracking is referred to as a direction T, and the direction of rolling is referred to as a direction R. These directions are shown in the figures.

Figure 2:
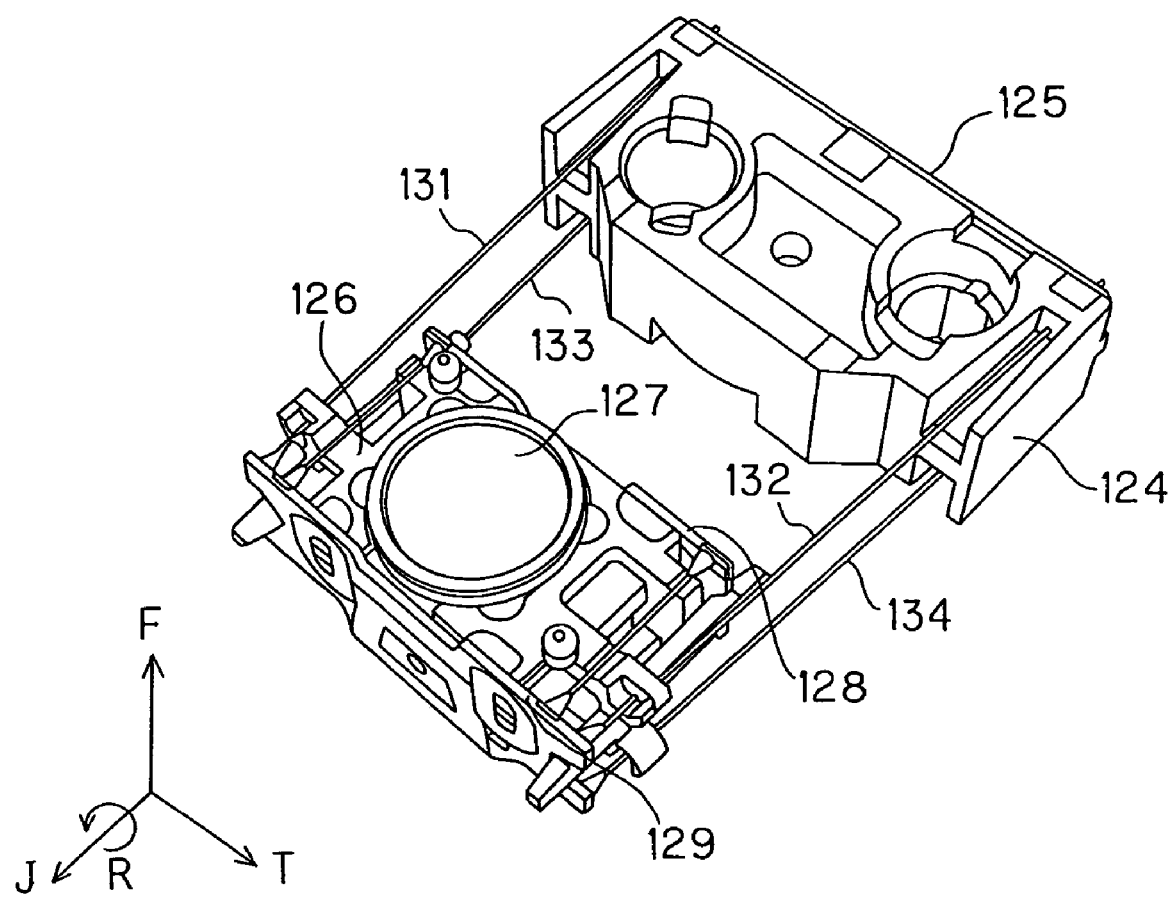
FIG. 2 is a perspective view of a lens driving apparatus according to an embodiment of the present invention.
Figure 3:
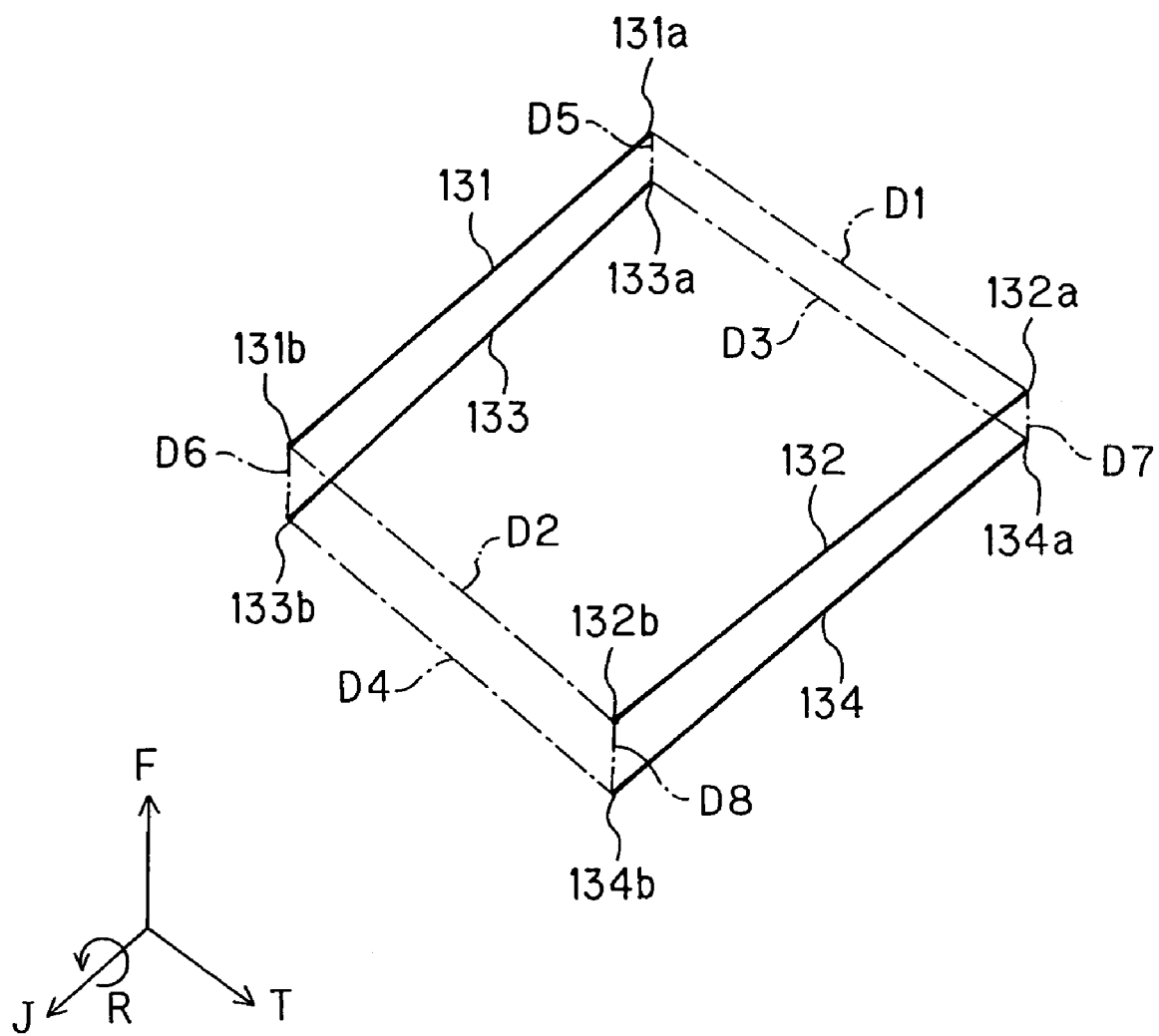
FIG. 3 is a perspective view of a suspension wire of the lens driving apparatus illustrated in FIG. 2.

As for a structure of the optical pick-up device according to the present invention, FIGS. 1 to 3 are used. FIG. 1 is a perspective view of the optical pick-up apparatus according to this embodiment. FIG. 2 is a perspective view of the lens driving apparatus according to this embodiment. FIG. 3 is a perspective view of the suspension wire of the lens driving apparatus shown in FIG. 2.

The optical pick-up apparatus 100 according to this embodiment includes an actuator body 110 that is joined to a frame (not shown) which includes an optical element such as a laser diode (LD) and a photo diode (PD), and a lens driving apparatus 120 (an actuator) which is fixed to the actuator body 110 by a fastener such as a screw as illustrated in FIGS. 1 and 2.

The lens driving apparatus 120 according to this embodiment includes an actuator base 121, a pair of magnets 122, 123, a suspension holder 124 as an example of a fixing member, an actuator substrate 125, a lens holder 126 as an example of a moving member, an objective lens 127, a pair of print coils 128, 129, and a plurality of suspension wires 131, 132, 133, 134.

The actuator base 121 has a pair of yokes 141, 142 to which magnets 122, 123 are fixed. The magnets 122, 123 are opposite to each other with interposing a space therebetween so as to form a magnetic field. The lens holder 126 is arranged between the magnets 122, 123.

The lens holder 126 is connected to the suspension holder 124 through the suspension wires 131, 132, 133, 134 to the suspension holder 124 so that the lens holder is movable in the direction F and the direction T. In other words, the lens holder 126 is supported by the suspension holder 124 so as to be in a floating state with a cantilever.

The objective lens 127 is held by the lens holder 126 so as to be opposite to an optical disk (not shown). The objective lens 127 converges light beams which are reflected by a standing mirror (not shown) and irradiates the converged light beams to the optical disk.

The suspension wires 131, 132, 133, 134 are rod like members formed by an electrically conductive material which electrically connects the actuator substrate 125 to the print coils 128, 129.

The actuator substrate 125 is fixed to the back side of the suspension holder 124 and supplies an electric current to the print coils 128, 129 through the suspension wires 131, 132, 133, 134.

The print coils 128, 129 are fixed to the both of side surfaces of the lens holder 126 and generate driving force (electromagnetic force) by an interaction between an magnetic force and an electric current to drive the lens holder 126 in the direction F and the direction T.

Further, the suspension wires 131, 132, 133, 134 are rod-like members which are made from a metallic material and elastically connect the suspension holder 124 to the lens holder 126.

The suspension wires 131, 132 are arranged along a flat surface (imaginary plane) which extends in a radius direction of the objective lens 127. Meanwhile, the suspension wires 131, 132 respectively form an example a first wire member and a second wire member.

The suspension wires 133, 134 are arranged along another flat surface (imaginary plane) which extends in a radius direction of the objective lens 127. Meanwhile, the suspension wires 133, 134 respectively form an example a third wire member and a fourth wire member.

Further, the suspension wires 131, 132, 133, 134 respectively have a first end 131a, 132a, 133a, 134a which is connected to the suspension holder 124 and a second end 131b, 132b, 133b, 134b which is connected to the lens holder 126.

The suspension wires 131, 132, 133, 134 are set as follows wherein a numerical reference D1 designates a distance between the first end 131a of the suspension wire 131 and the first end 132a of the suspension wire 132, a numerical reference D2 designates a distance between the second end 131b of the suspension wire 131 and the second end 132b of the suspension wire 132, a numerical reference D3 designates a distance between the first end 133a of the suspension wire 133 and the first end 134a of the suspension wire 134, a numerical reference D4 designates a distance between the second end 133b of the suspension wire 133 and the second end 134b of the suspension wire 134, a numerical reference D5 designates a distance between the first end 131a of the suspension wire 131 and the first end 133a of the suspension wire 133, a numerical reference D6 designates a distance between the second end 131b of the suspension wire 131 and the second end 133b of the suspension wire 133, a numerical reference D7 designates a distance between the first end 132a of the suspension wire 132 and the first end 134a of the suspension wire 134, and a numerical reference D8 designates a distance between the second end 132b of the suspension wire 132 and the second end 134b of the suspension wire 134.

These conditions are to make one of the distances D1 and D2 smaller than the other one, one of the distances D3 and D4 smaller than the other one, and one of the distances D3 and D4 smaller than the other one.

This conditions are established as D1>D2, D3>D4, D5<D6 and D7<D8.

Concretely, the suspension wires 131, 132, 133, 134 are arranged in a V-shape, i.e. in a shape of being widen toward the suspension holder 124. Namely, the V-shape is widen from the lens holder 126 to the suspension holder 124 on sides of the lens driving apparatus 120.

Although the conditions are described as D1>D2, D3>D4, D5<D6 and D7<D8 in this embodiment, these are not limited thereto and may be D1<D2, D3<D4, D5>D6 and D7>D8.

Further, the conditions are preferably D1=D3, D2=D4, D5=D7 and D6=D8.

Further, it is preferable that the conditions includes a distance difference of within ±10%.

Next, an actual measurement of resonance frequency of the lens driving apparatus according to the embodiment will be described in reference of FIG. 4. FIG. 4 shows the actual measurement value of the resonance frequency of the lens driving apparatus shown in FIG. 2.

The lens driving apparatus 120 according to the embodiment can make the resonance frequency in the direction R high by increasing a rate of a spring in the direction R, which rate of the spring is a result of the all of the suspensions 131, 132, 133, 134 because the lens driving apparatus 120 is set up to be the above conditions.

Concretely, the lens apparatus 120 is set up such that D1 and D3 are 14.4 mm, D2 and D4 are 12.4 mm, D5 and D7 are 2.8 mm, D6 and D8 are 3.0 mm, and differences of D5 and D7 respectively from D6 and D8 are −0.2 mm (−6.7%).

Accordingly, the resonance frequency in the direction R changes from 190 Hz in the embodiment to 135 Hz in the comparative example. On the contrary thereto, the resonance frequencies in the direction F and the direction T does not substantially change.

Namely, the lens apparatus 120 can change the resonance frequency in the direction R without changing the resonance frequencies in the direction F and the direction T because the lens apparatus 120 is set up to be in the above conditions.

As described, according to the embodiment, the lens driving apparatus 120 is characterized by having a structure as follows. Namely, the lens driving apparatus 120 includes the suspension holder 124, the lens holder 126 which is movably provided in the suspension holder 124, the objective lens 127 which is held by the lens holder 126, and the suspension wires 131, 132, 133, 134 for elastically connecting the suspension holder 124 to the lens holder 126, wherein as for the suspension wires 131, 132, 133, 134, the suspension wires 131, 132 are arranged along one planar extending in a direction of the radius of the objective lens 127 and the suspension wires 133, 134 are arranged along the other plane extending along a direction of the radius of the objective lens 127. Further, the suspension wires 131, 132, 133, 134 respectively have the first ends 131a, 132a, 133a, 134a which are connected to the suspension holder 124 and the second ends 131b, 132b, 133b, 134b which are connected to the lens holder 126. Further when the numerical reference D1 designates a distance between the first end 131a of the suspension wire 131 and the first end 132a of the suspension wire 132, the numerical reference D2 designates a distance between the second end 131b of the suspension wire 131 and the second end 132b of the suspension wire 132, the numerical reference D3 designates a distance between the first end 133a of the suspension wire 133 and the first end 134a of the suspension wire 134, the numerical reference D4 designates a distance between the second end 133b of the suspension wire 133 and the second end 134b of the suspension wire 134, the numerical reference D5 designates the distance between the first end 131a of the suspension wire 131 and the first end 133a of the suspension wire 133, the numerical reference D6 designates a distance between the second end 131b of the suspension wire 131 and the second end 133b of the suspension wire 133, the numerical reference D7 designates a distance between the first end 132a of the suspension wire 132 and the first end 134a of the suspension wire 134, and the numerical reference D8 designates a distance between the second end 132b of the suspension wire 132 and the second end 134b of the suspension wire 134, the conditions are established such that one of the distances D1 and D2 is smaller than the other, one of the distances D3 and D4 is smaller than the other, one of the distances D5 and D6 is smaller than the other and one of the distances D7 and D8 is smaller than the other.

According to this structure, in this embodiment, since the conditions are set up as described above, the entire rate of spring in the direction R of the suspension wires 131, 132, 133, 134 can be changed and the resonance frequency in the direction R can be changed. Further, the resonance frequency in the direction R can be set out of a range of a rotational frequency of an optical disk. Therefore, it is possible to suppress a rolling phenomenon by which the lens holder 126 rotates in the direction R. Accordingly, the coma aberration is suppressed and signal deterioration is prevented.

Further, in this embodiment, it is structured that the conditions of D1=D3, D2=D4, D5=D7 and D6=D8 are satisfied.

Further, according to this structure, since the conditions are set up as above, it is possible to change the resonance frequency in the direction R without changing the resonance frequencies the direction F and T.

Further, in this embodiment, it is structured that the conditions of D1<D2, D3<D4, D5>D6 and D7>D8 are satisfied.

According to this embodiment, since the conditions are set up as above, it is possible to make the resonance frequency in the direction R high by increasing the entire rate of spring of the suspension wires in the direction R.

Further, in this embodiment, it is structured that the conditions of D1<D2, D3<D4, D5>D6 and D7>D8 are satisfied.

According to this structure, it is possible to increase the entire rate of spring in the direction R and therefore the resonance frequency in the direction R is increased.

Further, in this embodiment, the structure includes a condition that the difference of the distance is within ±10%.

According to this structure, since the conditions are set up as in the above conditions, the resonance frequency in the direction R can be changed without changing the resonance frequency in the direction F and the resonance frequency in the direction T.

Further, in this embodiment, the suspension wires 131, 132, 133, 134 may be connected to the suspension holder 124 at the first ends 131a, 132a, 133a, 134a and to the lens holder 126 at the second ends 131b, 132b, 133b, 134b. However, it is possible to integrally mold (insert mold) the suspension wires with the suspension holder 124 and/or the lens holder 126.

Further, in this embodiment, it is structured that the suspension wires 131, 132, 133, 134 are made of a plurality of elastic members. However, it is not limited thereto, and the suspension wires may be a plurality of elastic members (for example the number is four) and a plurality of rigid members (for example the number is two)

The present invention is not confined to the configurations listed in the foregoing embodiments, but it is easily understood that the person skilled in the art can modify such configurations into various other modes, within the scope of the present invention described in the claims.

The entire disclosures of Japanese Patent Applications No. 2004-205393 filed on Jul. 13, 2004 including the specification, claims, drawings and summary are incorporated herein by reference in its entirety.

What is claimed is:

1. A lens driving apparatus comprising:
a fixing member;
a moving member which is movably provided with respect to the fixing member;
an objective lens which is held by the movable member;
a connecting member which elastically connects the fixing member to the movable member, wherein
the connecting member includes a first wire member and a second wire member which are arranged along a planar surface extending along a direction of the radius of the objective lens and a third wire member and a fourth wire member which are arranged along another planar surface extending along a direction of the radius of the objective lens,
the first to fourth suspension wire members respectively have first ends which are connected to the fixing member and second ends which are connected to the movable member, and
one of distances D1 and D2 is smaller than the other, one of distances D3 and D4 is smaller than the other, one of distances D5 and D6 is smaller than the other and one of distances D7 and D8 is smaller than the other where
the distance D1 designates a distance between the first end of the first suspension wire member and the first end of the second suspension wire member,
the distance D2 designates a distance between the second end of the first suspension wire member and the second end of the second suspension wire member, the distance D3 designates a distance between the first end of the third suspension wire member and the first end of the fourth suspension wire member, the distance D4 designates a distance between the second end of the third suspension wire member and the second end of the fourth suspension wire member, the distance D5 designates the distance between the first end of the first suspension wire member and the first end of the third suspension wire member, the distance D6 designates a distance between the second end of the first suspension wire member and the second end of the third suspension wire member, the distance D7 designates a distance between the first end of the second suspension wire member and the first end of the fourth suspension wire member, and the distance D8 designates a distance between the second end of the second suspension wire member and the second end of the fourth suspension wire member.

2. A lens driving apparatus according to claim 1, wherein D1=D3, D2=D4, D5=D7 and D6=D8 are satisfied.

3. A lens driving apparatus according to claim 2, wherein D1>D2, D3>D4, D5<D6 and D7<D8 are satisfied.

4. A lens driving apparatus according to claim 2, wherein D1<D2, D3<D4, D5>D6 and D7>D8 are satisfied.

5. A lens driving apparatus according to claim 2, wherein differences of the distances are within ±10% of the distances to be compared.

6. A lens driving apparatus according to claim 1, wherein D1>D2, D3>D4, D5<D6 and D7<D8 are satisfied.

7. A lens driving apparatus according to claim 6, wherein differences of the distances are within ±10% of the distances to be compared.

8. A lens driving apparatus according to claim 1, wherein D1<D2, D3<D4, D5>D6 and D7>D8 are satisfied.

9. A lens driving apparatus according to claim 8, wherein differences of the distances are within ±10% of the distances to be compared.

10. A lens driving apparatus according to claim 1, wherein differences of the distances are within ±10% of the distances to be compared.

* * * * *